United States Patent [19]

Moreau et al.

[11] Patent Number: 6,053,966
[45] Date of Patent: Apr. 25, 2000

[54] ABSORBENT HAVING HETEROGENEOUS EXCHANGE FACTOR AND PSA PROCESS EMPLOYING SUCH AN ABSORBENT

[75] Inventors: Serge Moreau, Velizy-Villacoublay; Jacques Labasque, Versailles; Dominique Rouge, Malakoff, all of France

[73] Assignee: L'Air Liquide, Societe Anonyme pour l'Etude et l'Exploitation des Procedes Georges Claude, Paris Cedex, France

[21] Appl. No.: 09/158,152

[22] Filed: Sep. 22, 1998

[30] Foreign Application Priority Data

Mar. 3, 1998 [FR] France ................................. 98 02557

[51] Int. Cl.⁷ ................................................. B01D 53/047
[52] U.S. Cl. ................................. 95/96; 95/130; 95/140; 95/902; 96/108; 502/79
[58] Field of Search ................. 95/96–98, 100–105, 95/130, 902; 96/108, 130, 144; 502/79, 85

[56] References Cited

U.S. PATENT DOCUMENTS

| | | | |
|---|---|---|---|
| 3,140,933 | 7/1964 | McKee | 95/130 |
| 4,744,805 | 5/1988 | Maroulis et al. | 95/130 X |
| 4,859,217 | 8/1989 | Chao | 95/130 |
| 4,925,460 | 5/1990 | Coe et al. | 95/130 X |
| 5,152,813 | 10/1992 | Coe et al. | 95/103 |
| 5,173,462 | 12/1992 | Plee | 502/67 |
| 5,203,887 | 4/1993 | Toussaint | 95/130 X |
| 5,258,058 | 11/1993 | Coe et al. | 95/130 X |
| 5,258,060 | 11/1993 | Gaffney et al. | 95/101 |
| 5,266,102 | 11/1993 | Gaffney et al. | 95/103 |
| 5,268,023 | 12/1993 | Kirner | 95/103 |
| 5,354,360 | 10/1994 | Coe et al. | 95/101 |
| 5,451,383 | 9/1995 | Leavitt | 423/179.5 |
| 5,464,467 | 11/1995 | Fitch et al. | 95/102 X |
| 5,531,808 | 7/1996 | Ojo et al. | 95/101 X |
| 5,562,756 | 10/1996 | Coe et al. | 95/103 X |
| 5,604,169 | 2/1997 | Leavitt | 502/60 |
| 5,616,170 | 4/1997 | Ojo et al. | 95/101 |
| 5,658,370 | 8/1997 | Vigor et al. | 95/130 X |
| 5,672,195 | 9/1997 | Moreau et al. | 95/130 X |
| 5,868,818 | 2/1999 | Ogawa et al. | 95/902 X |
| 5,922,107 | 7/1999 | Labasque et al. | 95/103 X |

FOREIGN PATENT DOCUMENTS

| | | |
|---|---|---|
| 0 591 919 | 4/1994 | European Pat. Off. . |
| 0 667 183 | 8/1995 | European Pat. Off. . |
| 229 391 | 11/1985 | Germany . |

*Primary Examiner*—Robert Spitzer
*Attorney, Agent, or Firm*—Young & Thompson

[57] ABSTRACT

A heterogeneous adsorbent for the separation of gases, comprising particles of at least one zeolite containing at least one exchanged metal cation selected from monovalent, divalent and/or trivalent cations, the zeolite having an exchange-factor distribution of given mean having a standard deviation for the exchange-factor distribution of between about 0.3% and 5%, and a PSA, VSA or TSA process for separation of a gas flow, such as air, containing at least a first compound, such as nitrogen, which is adsorbed preferentially on the heterogeneous adsorbent, and at least a second compound, such as oxygen, which is less preferentially adsorbed on the heterogeneous adsorbent than the first compound.

14 Claims, 2 Drawing Sheets

ABSORBENT HAVING HETEROGENEOUS EXCHANGE FACTOR AND PSA PROCESS EMPLOYING SUCH AN ABSORBENT

The invention relates to an adsorbent having a heterogeneous exchange factor, and to a process of the PSA type, and more particularly of the VSA type, for separation of a gas flow, in particular a gas flow containing essentially oxygen and nitrogen, such as air, using a heterogeneous adsorbent of this type.

The gases in air, such as in particular oxygen and nitrogen, are very important industrially. At present, one of the non-cryogenic techniques used for producing these gases is the technique referred to as PSA (Pressure Swing Adsorption), which encompasses not only PSA processes proper, but also similar processes, such as VSA (Vacuum Swing Adsorption) or MPSA (Mixed Pressure Swing Adsorption) or TSA (Temperature Swing Adsorption) processes.

According to this PSA technique, when the gas mixture to be separated is air and the component to be recovered is oxygen, the oxygen is separated from the gas mixture using preferential adsorption of at least nitrogen on a material which preferentially adsorbs at least nitrogen and is subjected to cycles of given pressure in the separation zone.

The oxygen, which is adsorbed little or not at all, is recovered at the outlet of the separation zone; it has a purity, in general, higher than 90%, possibly 93% or more.

More generally, a PSA process for the non-cryogenic separation of a gas mixture comprising a first compound which is adsorbed preferentially on an adsorbent material, and a second compound which is less preferentially adsorbed on the adsorbent material than the first compound, with a view to producing the second compound, cyclically comprises:

- a step of preferentially adsorbing at least the first compound on the adsorbent material, at an adsorption pressure referred to as the "high pressure", with recovery of at least some of the second compound produced in this way;
- a step of desorbing the first compound trapped in this way by the adsorbent, at a desorption pressure which is lower than the adsorption pressure and is referred to as the "low pressure";
- a step of recompressing the separation zone comprising the adsorbent, by progressively changing from the low pressure to the high pressure.

However, it is known that the separation efficiency for a gas mixture, such as air, depends on a number of parameters, in particular the high pressure, the low pressure, the type of adsorbent material used and its affinity for the compounds to be separated, the composition of the gas mixture to be separated, the adsorption temperature of the mixture to be separated, the size of the adsorbent particles, the composition of these particles and the temperature gradient set up inside the adsorbent bed.

At present, although it has not been possible to determine a general behaviour law, knowing that it is very difficult to connect these various parameters with one another, it is also known that the nature and properties of the adsorbent have an essential role in the overall efficiency of the process.

Currently, zeolites, in particular type A, chabazite, mordenite and faujasite (X or LSX for Low Silica X), are the adsorbents most widely used in PSA processes.

The zeolite particles customarily contain mono-, di- and/or trivalent metal cations, for example cations of alkali metals, alkaline-earth metals, transition metals and/or lanthanides, incorporated during the synthesis of the zeolite particles and/or inserted subsequently by an ion-exchange technique.

Ion exchange is generally carried out by bringing the unexchanged zeolite particles or raw zeolite into contact with a solution of one or more metal salts comprising the cation or cations to be incorporated into the zeolite structure, and subsequently recovering the particles of exchanged zeolite, that is to say zeolite containing a given quantity of metal cations. The proportion of metal cations introduced into the zeolite structure, relative to the total exchange capacity, is referred to as the exchange factor, which is between 0 and 100%.

It is conventionally recommended to try to obtain a perfectly homogeneous adsorbent, that is to say one having no variation, or the least possible variation, not only in exchange factor but also in capacity and/or selectivity.

This concept of an adsorbent with homogeneous exchange factor is moreover found clearly in documents EP-A-486384 and EP-A-606848.

Specifically, EP-A-486384 teaches mixtures of A and X zeolites which have an Si/Al ratio equal to 1±0.003 and are between 80% and 99% exchanged with calcium ions, that is to say an exchange-factor interval in which the adsorbent should lie, which adsorbent is homogeneous for each example. This document thus describes X zeolites which are 87% or, depending on the case, 96% exchanged with calcium ions. It can therefore be seen that, although this document places the emphasis on a possible variation in the chemical composition of the adsorbent, since the Si/Al ratio is given to within ±0.003, the same is not true as regards the exchange factor, which is considered as being homogeneous and unique for each industrial adsorbent considered, for example an exchange factor equal to 87% or 96%.

Similarly, for its part, document EP-A-606848 discloses exchange-factor intervals in which the adsorbents to be used should lie, but not the degree of homogeneity of the adsorbent.

In other words, these documents neither describe nor take account of the existence of possible fluctuations in the exchange factor of the adsorbent, that is to say its degree of heterogeneity.

The consequence of this is that, at present, the adsorbents regarded as being good adsorbents for the separation of gases, in particular for the separation of the gases in air by a process of the PSA type, are those whose exchange factor is as homogeneous as possible, the unique value of exchange factor varying for each application in a given range.

More generally, no document in the prior art has hitherto shown or underlined, the possible effect of the degree of heterogeneity of the exchange factor of a given adsorbent, and the impact that this degree of heterogeneity may have, in particular, on the performance of a PSA process employing a heterogeneous adsorbent of this type.

Moreover, the adsorbents most widely used in processes for separating gases, in particular air, are zeolites, in particular of the X or LSX type, highly exchanged, in general to more than 80% or even to more than 88%, with cations of very expensive metals, such as in particular lithium cations.

Conventionally, a lithium-exchanged faujasite is prepared from a faujasite containing essentially sodium and potassium cations, which is brought into contact with a solution of lithium salts, such as lithium chloride. Substitution of the sodium and/or potassium ions included in the three-dimensional structure of the zeolite by lithium ions then takes place. The degree of progress of the ion exhange is characterized by the exchange factor, which is equal to the proportion of cationic sites, associated with aluminium atoms in the tetrahedral position, which are occupied by lithium cations. Mention may in this regard be made of documents U.S. Pat. No. 4,859,217 or U.S. Pat. No. 5,268,023.

However, the fact that only zeolites can be used to separate gas mixtures, in particular highly exchanged zeolites whose exchange factor is fully homogeneous, leads to an inevitable and considerable increase in the overall manufacturing costs of the adsorbent and, consequently, the costs of the separation process and the gases produced in this way.

Specifically, the costs of industrially preparing adsorbents, such as zeolites, exchanged with metal cations, such as lithium, are largely due to the high price of the metal salts employed because as emphasized by document EP-A-659481, in order to allow correct and homogeneous exchange of the zeolite, it is in general necessary to use a considerable quantity of solution of metal salts, such as lithium chloride. A high reject rate also results, given that it is then necessary to perform rigorous quality control and strict selection of the adsorbents after they have been manufactured.

Nevertheless, no document in the prior art gives any indication as to the possibility of using an adsorbent which has a certain degree of heterogeneity. On the contrary, it is customarily recommended to percolate the metal salt solution through the, adsorbent until the ion concentration balances and becomes uniform through the adsorbent bed, that is to say of homogeneous composition, as referred to by document U.S. Pat. No. 5,604,169.

The object of the present invention is therefore to provide an adsorbent having a heterogeneous exchange factor and whose performance is still acceptable in industrial terms, in spite of the degree of heterogeneity of the adsorption properties of the various adsorbent particles, as well as a gas separation process using a heterogeneous adsorbent of this type, in particular a PSA process for separation of the gases in air.

Thus, for equivalent performance, the process using a heterogeneous adsorbent according to the invention leads to a significantly lower manufacturing cost than one using a homogeneous adsorbent according to the prior art, given that it allows greater flexibility in terms of the exchange characteristics of the adsorbent; the term adsorbent is intended to mean a product of a single type, for example, a given zeolite, such as in particular a type A zeolite or a type X or LSX zeolite.

In other words, the industrial heterogeneous adsorbent according to the invention can be manufactured at a lower cost than conventional adsorbents, because its degree of heterogeneity makes it possible to simplify the manufacturing procedure, both as regards the consumption of exchangeable salts and the controlling of the parameters of the production process and the quality control expenditure; the differences in performance of the adsorbent according to the invention when it is employed in a PSA process, being, for their part, negligible in comparison with a conventional adsorbent which is homogeneous and therefore more expensive.

The present invention therefore relates to a heterogeneous adsorbent for the separation of gases, comprising particles of at least one zeolite containing at least one exchanged metal cation selected from monovalent, divalent and/or trivalent cations, the zeolite having an exchange-factor distribution of given mean in excess of 0% and less than 100%, preferably from 10% to about 99% and having a standard deviation for the exchange-factor distribution of between about 0.3% and 5%.

The exchange factor, expressed in %, is the proportion of metal cations exchanged in relation to the maximum exchange capacity in the zeolite phase.

In practice, a property distributed heterogeneously in a medium can be studied by samples, the number of which depends on the desired degree of accuracy. The analysis can thus be carried out using between 20 and 100 samples of adsorbent particles, for example. In any case, the sample must be large enough for a complete chemical analysis to be made, that is to say one or a few particles when they have a size of the order of a millimetre. The samples are taken in accordance with the sampling rules.

The two main parameters of a distribution are the mean $\mu$ and standard deviation $\sigma$ of the distribution, with:

$$\mu = \int f(x).dx \text{ and } \sigma^2 = \int (f(x)-\mu)^2 . dx$$

where f is the probability density of the exchange factor distribution.

Furthermore, another significant parameter of interest is the range $\delta$ of the distribution, that is to say the difference between the largest and smallest values measured in a given sample. In practice, during an industrial exchange of adsorbent particles with a metal salt solution, there is necessarily a highest value of the exchange factor, corresponding to the most highly exchanged zeolite particles, and a smallest value of the exchange factor, corresponding to the least exchanged zeolite particles.

The result of this is that, since an ion exchange process is based on more or less progressive contact of an ionic solution for exchange with the zeolite particles, there is often an exchange-factor gradient oriented in a preferential direction, for example the direction of flow of the exchange solution within the exchange columns.

In this particular case, there is then a relationship between the range $\delta$ and the standard deviation $\sigma$, namely:

$$\delta \approx 2.(\sqrt{3}).\sigma$$

The range $\delta$ therefore depends closely on the conditions of the exchange, which means that it is very difficult and very costly to reduce it to zero, as recommended by the prior art documents which advocate the use of adsorbents which are as homogeneous as possible. The range will therefore lead to a heterogeneous product with a standard deviation $\sigma$ connected with the range $\delta$, as explained above.

Depending on the case, the heterogeneous adsorbent of the invention may include one or more of the following characteristics:

the standard deviation for the exchange-factor distribution is between about 0.5% and 4%, preferably between about 0.7% and 3%, advantageously between about 1% and 2%, the zeolite is selected from A zeolites, mordenite, faujasite, chabazite, clinoptilolite ZSM-3 and ZSM-5, preferably the zeolite is an X or LSX zeolite, the cations are selected from the group formed by lithium, sodium, calcium, zinc, copper, aluminium, manganese, potassium, strontium or nickel cations and mixtures thereof, preferably from lithium, calcium and potassium cations, the zeolite contains at least 50% of lithium cations and/or at least 10% of calcium cations and/or at least 5% of zinc cations, it has an Si/Al ratio of from 1 to 1.25, preferably about 1 to 1.1, it comprises at least one zeolite selected from the group formed by a faujasite exchanged with lithium ions whose mean exchange factor is between about 70% and about 88%, a faujasite exchanged with lithium ions whose mean exchange factor is between about 88% and about 93%, and a faujasite exchanged with lithium ions whose mean exchange factor is between about 93% and about 99%, it comprises at least one zeolite selected from the group formed by a faujasite exchanged with calcium ions whose mean exchange factor is between about 65% and about 95%, it comprises at least one zeolite selected from the group formed by a faujasite exchanged with calcium and/or lithium ions, and furthermore containing sodium and/or potassium cations.

The invention also relates to a process for manufacturing a heterogeneous adsorbent according to the invention, in which:

a solution of at least one salt of a monovalent, divalent or trivalent metal is percolated through at least one ion-exchange column containing zeolite particles, the percolation is stopped before having consumed a quantity of the metal salt equal to about 4 stoichiometric amounts, the monovalent, divalent or trivalent metal content of the zeolite particles is homogenized without varying the total quantity of the metal contained in the particles, and so as to obtain a standard deviation for the exchange-factor distribution of between about 0.3% and 5%, preferably between 0.5% and 4%, more preferably between 0.7 and 3%, advantageously between 1% and 2% approximately.

Preferably, the metal content of the zeolite is homogenized by closed-loop recirculation of at least some of the metal salt solution.

Preferably, the salt is a chloride, the metal is selected from lithium, calcium, sodium, zinc and mixtures thereof, and/or the zeolite is a faujasite whose Si/Al ratio is about 1, that is to say an LSX zeolite.

The invention furthermore relates to a PSA (Pressure Swing Adsorption) process for separation of a gas flow containing at least a first compound, being adsorbed preferentially on at least one homogeneous adsorbent according to the invention, and at least a second compound, being less preferentially adsorbed on at least the heterogeneous adsorbent than the first compound.

Depending on the case, the process of the invention may comprise one or more of the following characteristics:

the gas flow to be separated comprises a polar compound, in particular nitrogen and/or CO, and at least one less polar compound, in particular oxygen and/or hydrogen, and, preferably, the gas flow is air, the first compound being nitrogen and the second compound being oxygen; the air being, in the scope of the present invention, the air contained inside a building or a heated or unheated chamber, or the outside air, that is to say under atmospheric conditions, taken as such or optionally pretreated, the first compound is nitrogen and the second compound is oxygen; and an oxygen-rich gas flow is produced, that is to say one generally comprising at least 90% of oxygen, it is of the VSA (Vacuum Swing Adsorption) or TSA (Temperature Swing Adsorption) type, the high pressure for adsorption is between $10^5$ Pa and $10^7$ Pa, preferably of the order of $10^5$ to $10^6$ Pa, and/or the low pressure for desorption is between $10^4$ Pa and $10^6$ Pa, preferably of the order of $10^4$ Pa to $10^5$ Pa, the feed temperature is between 10° C. and 80° C., preferably between 25° C. and 60° C.

The invention furthermore relates to a device capable of carrying out a PSA process, such as the process described above, comprising at one adsorber and, preferably, from 1 to 3 adsorbers.

It should furthermore be noted that the present invention also applies to each of the adsorbers of a process employing several adsorbents, for example a multibed process.

The invention will now be described in more detail with the aid of examples which are given by way of illustration but without implying any limitation.

EXAMPLES

The following procedure is used to prepare a heterogeneous adsorbent according to the invention, for example a zeolite of the faujasite type exchanged with lithium.

Firstly, a solution of the selected metal salt, such as a lithium chloride, is percolated through one or more ion-exchange columns containing the sodium-based zeolite particles, as described conventionally in the prior art, but stopping the percolation before having consumed a quantity of lithium salt equal to 4 stoichiometric amounts.

To this end, for example, use is made of a set of 4 ion-exchange columns A, B, C, D placed in series, that is to say the outlet of a column n is connected to the inlet of a column n+1, these being such that, at regular intervals, the column A which is placed furthest upstream, that is to say closest to the source of the lithium salt flow, is emptied of the zeolite particles which it contains, optionally undergoes one or more auxiliary treatments (rinsing, homogenization, etc.), is filled with new zeolite particles and is then placed downstream of the other columns B, C and D.

For example, an auxiliary treatment for adjusting the range of the exchange-factor distribution, of the zeolites contained in a column A, to a given value of between 1% and 15%, for example a value equal to about 4%, may consist in homogenizing the exchange-factor distribution by recirculating the lithium solution in closed loop, so that the lithium salt solution leaving column A is reintroduced into the inlet of the column A, this being repeated several times.

This recirculation may be carried out with the same lithium salt solution or with a different solution, that is to say the solution used during the auxiliary treatment may or may not be the same solution as that used during the exchange phase proper; the same considerations hold true for the lithium concentration, flow rate and/or temperature.

During this auxiliary treatment, the total quantity of lithium present in the zeolite does not vary for a given solution, but is merely redistributed to bring the exchange-factor range to the selected value of between 1% and 15%, for example 4%.

The important flow parameter is the recirculation factor (RF), expressed as being the stoichiometric ratio between the total quantity of solution recirculated and the exchange capacity of the zeolite, and given by the following formula:

$$RF = D.t.C_s/M_z.C_z$$

in which:

D is the solution flow rate (in $1s^{-1}$), t is the recirculation time (in s), $C_s$ is the normality of the solution (in $eq.1^{-1}$), $M_z$ is the mass of adsorbent (in kg) involved in the recirculation, $C_z$ is the exchange capacity of the adsorbent (eq/kg).

In the case of exchange in a column with axial flow, the exchange factor gradient varies continuously along the axis.

Thus, Examples 1 and 2 below describe faujasite-type zeolites exchanged with lithium ions, in which the difference between the maximum exchange factor and the minimum exchange factor, that is to say the range, is equal to about 4%.

Of course, the ion exchange and the auxiliary treatment may be carried out in the same exchange column, or in different columns, or in a tank in which the solution is set in motion by suitable means.

The zeolite obtained in this way has a range of the lithium-exchange factor of between 1% and 15%, that is to say a certain exchange-factor heterogeneity.

The synthesis of a heterogeneous zeolite of this type requires less consumption of lithium salt, which means a reduction in cost, in particular for high exchange factors.

Example 1

By applying the process of the invention, described above, a heterogeneous adsorbent according to the invention was manufactured which consisted of zeolite particles of the faujasite type, having an Si/Al ratio of the order of 1, which ware exchanged with lithium ions and whose mean exchange factor is 86% with a range of 4%, i.e. in this case zeolite particles exchanged by about 84% to 88%.

To do this, use was made of a lithium chloride solution having a concentration 1.4N. The ion exchange is carried out at a temperature of about 100° C. and the flow rates are adjusted so that the mean exchange factor of the zeolite is 86% after exchange.

Under these conditions, the initial range, obtained after the ion exchange step, is 33%, that is to say a mixture of zeolite particles is obtained in which the least exchanged particles contain 66% of lithium and the most highly exchanged particles contain 99% of lithium cations.

The stoichiometric amounts used to obtain this steady-state distribution profile, that is to say the quantity of lithium percolated through each column, are about 1.17, which is much less than the stoiciometric values in the prior art, which are usually between 4 and 12.

At this stage, the zeolite is unable as such, given that the adsorption properties vary by a factor of about 3 depending on the exchange factor of the particles in question, namely from 66% to 99%.

The lithium chloride solution used for the ion exchange is then recirculated in closed circuit, under the same temperature and concentration conditions.

A progressive reduction in the standard deviation and range of the exchange-factor distribution is then obtained, but without altering the mean value of the exchange factor, namely 86%. The results are given in Table I below.

TABLE I

| Recirculation factor (RF) | Maximum exchange factor range |
| --- | --- |
| 0 | 33% |
| 3 | 6% |
| 4 | 4% |

Hence, by adjusting the duration, concentration or flow rate of recirculation, the desired degree of heterogeneity is achieved.

In other words, the maximum exchange-factor range for the heterogeneous zeolite adsorbent obtained is 4% with a mean exchange-factor value of 86%. The maximum exchange-factor range corresponding to the variation in exchange factor between the maximum exchange factor and the minimum exchange factor.

The standard deviation of the exchange-factor distribution obtained is then about 1.2%, that is to say it is well within the intervals claimed by the present invention, in particular in the interval 0.3% to 5%.

Example 2

By carrying out the procedure as in Example 1 above, a heterogeneous adsorbent was manufactured which consisted of zeolite particles of the faujasite type (Si/Al equal to about 1) which were exchanged with lithium cations and whose exchange factor varies between 95 and 99%, with a mean exchange-factor value of 97.5%. Here, as in Example 1, the exchange-factor range is about 4%.

The stoichiometric amounts involved, in this case, are about 1.90, which is here again much less than the stoichiometric values of the prior art (between 4 and 12).

The heterogeneous zeolites in Examples 1 and 2 can be employed in a PSA, preferably VSA, process for separating the gases in air. In fact, it has very unexpectedly been observed that the performance of a VSA process is maintained up to a standard deviation for the exchange-factor distribution of the adsorbent which may attain values of 4%, or even 7%.

In other words, in contrast to the teaching of the prior art, it is now possible to use a heterogeneous adsorbent such as that of the invention in a PSA, in particular a VSA, process.

Moreover, since a heterogeneous adsorbant is less expensive than a conventional homogeneous adsorbent, a PSA unit, for example a VSA unit for the production of oxygen, comprising one or more adsorbers filled with a heterogeneous adsorbent according to the present invention leads to a significant reduction in the production cost of the gas, in particular oxygen, in comparison with a conventional process employing a homogeneous adsorbent.

Example 3

In order to illustrate the present invention, FIGS. 1 to 4 represent comparative curves possible profiles for the exchange factor and exchange-factor distribution for various adsorbents.

More precisely,

The characteristics of the distributions arising from FIGS. 1 to 4 are illustrated in Table II below.

TABLE II

| Case | Exchange- (in %) factor distribution | | | Test according to the invention |
|---|---|---|---|---|
| | Mean ($\mu$) | Standard deviation ($\sigma$) | Range ($\delta$) | |
| a1 | 81.6 | 9.3 | 30 | no |
| a2 | 81.6 | 2.2 | 7 | yes |
| a3 | 81.6 | 0 | 0 | no |
| b1 | 94.2 | 5.8 | 18.1 | no |
| b2 | 94.2 | 1.3 | 4 | yes |
| b3 | 94.2 | 0 | 0 | no |

In view of Table II, it can be seen that only cases a2 and b2 are in accordance with the present invention, that is to say they have a suitable exchange-factor distribution.

Figure 1:
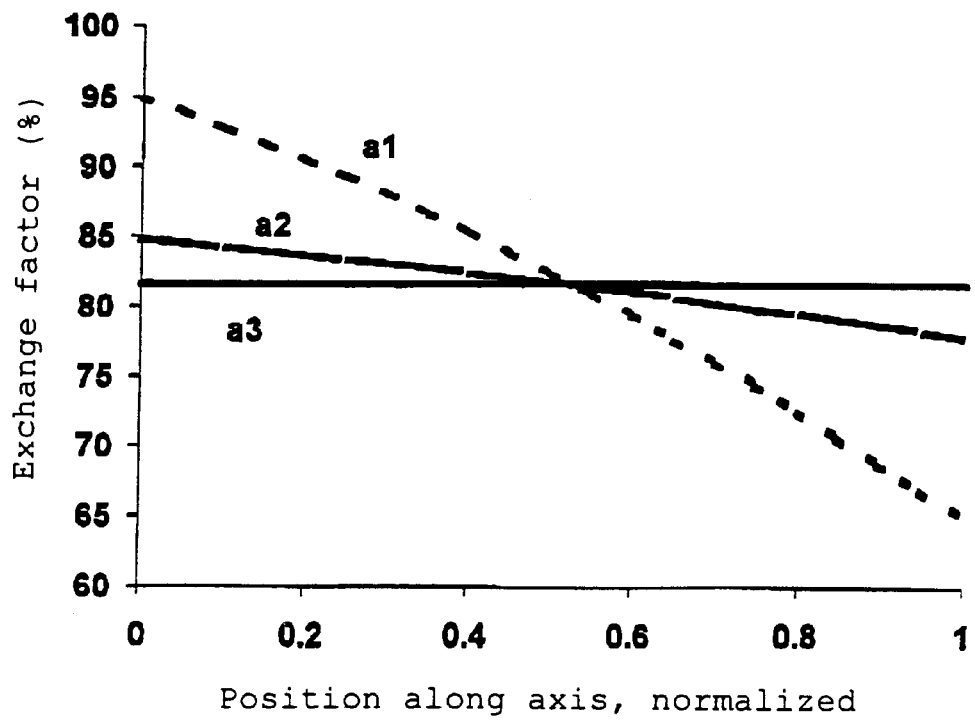
FIG. 1 represents a diagram with three possible exchange-factor profiles along the axis of the ion-exchange column in which an ion-exchange process is carried out, for a mean exchange factor of 81.6% in three cases a1, a2 and a3.
Figure 2:
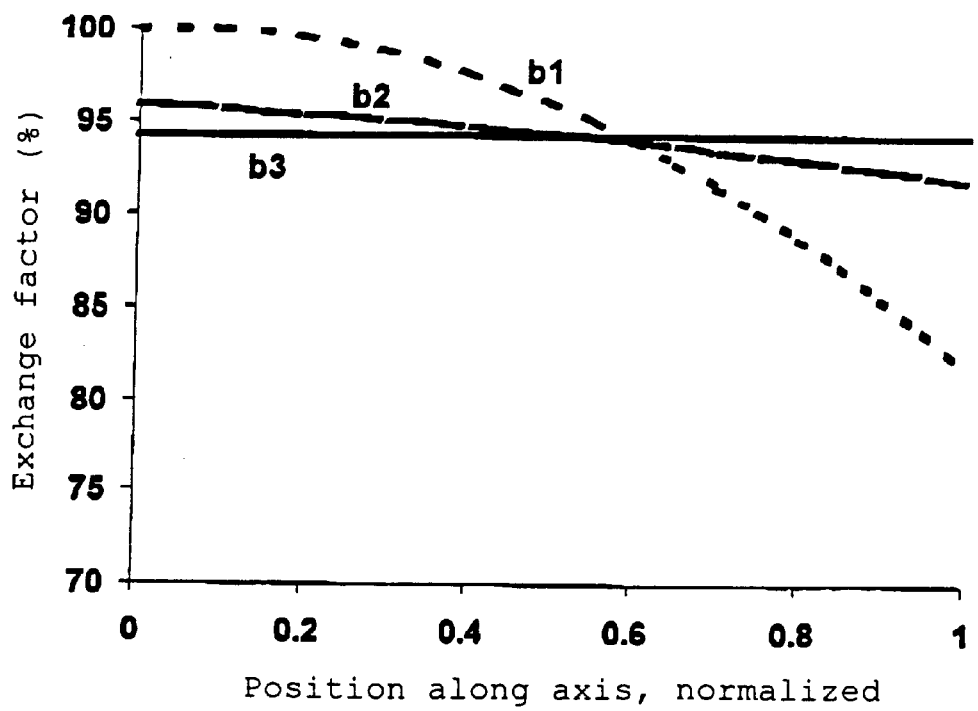
FIG. 2 represents a diagram similar to that in FIG. 1, showing the curves of possible profiles corresponding to a mean exchange factor of 94.2% (cases b1, b2 and b3)
Figure 3:
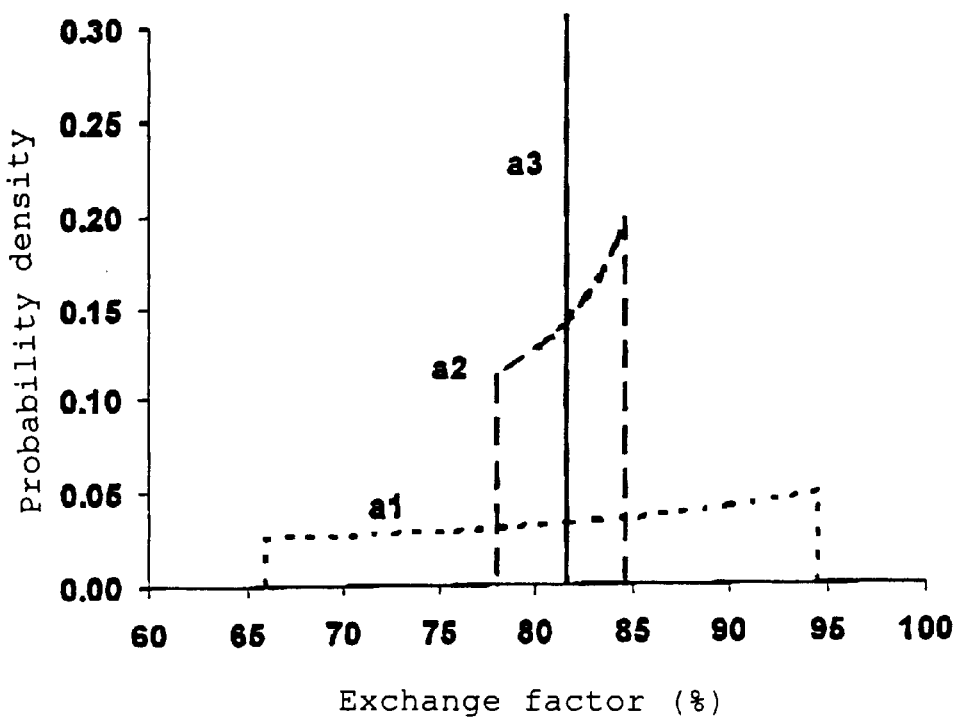
FIG. 3 represents a diagram of the exchange-factor distributions for a mean exchange factor of 81.6%, corresponding to the exchange-factor profiles in FIG. 1 (cases a1, a2 and a3)
Figure 4:
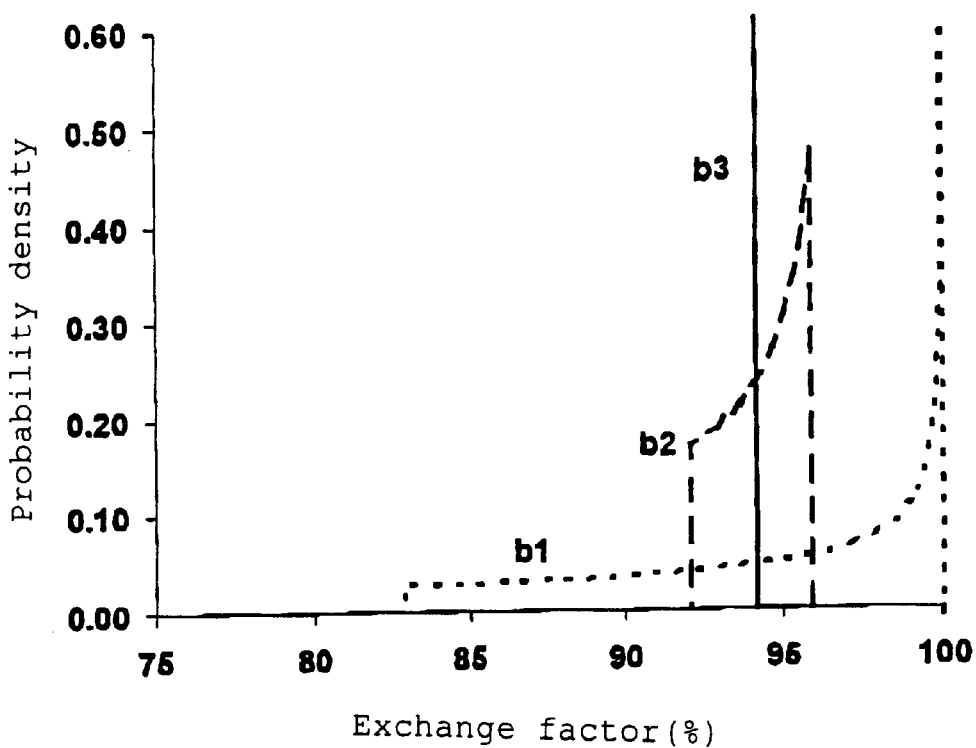
FIG. 4 represents a diagram of the exchange-factor distributions for a mean exchange factor of 94.2%, corresponding to the exchange-factor profiles in FIG. 2 (cases b1, b2 and b3).

Conversely, cases a1 and b1, although having a heterogeneous distribution, do not fall within the scope of the invention because they also have too wide a distribution of the exchange factor; this is moreover clearly shown in FIGS. 3 and 4.

In addition, tests a3 and b3 have, for their part, a homogeneous distribution which does not fall within the scope of the invention because it is in accordance with the teaching of the prior art; this is moreover clearly shown in FIGS. 3 and 4.

The present invention is not limited to the field of producing oxygen from air and may accordingly be applied to the separation of other gas flows, such as in particular flows containing hydrogen, carbon dioxide and/or carbon monoxide, in particular to the production of synthesis gas or "syngas".

What is claimed is:

1. Heterogeneous adsorbent for the separation of gases, comprising particles of at least one zeolite containing at least one exchanged metal cation selected from the group consisting of monovalent, divalent and trivalent cations, said zeolite having an exchange-factor distribution of given mean in excess of 0% and less than 100%, and having a standard deviation for the exchange-factor distribution of between about 0.3% and 5%.

2. Adsorbent according to claim 1, wherein the standard deviation for the exchange-factor distribution is between about 0.5% and 4%.

3. Adsorbent according to claim 1, wherein the zeolite is selected from the group consisting of A zeolites, mordenite, chabazite, faujasite, clinoptilolite, ZSM-3 and ZSM-5.

4. Adsorbent according to claim 1, wherein the cations are selected from the group consisting of lithium, sodium, calcium, zinc, copper, aluminium, potassium, strontium, manganese and nickel cations and mixtures thereof.

5. Adsorbent according to claim 1, wherein the zeolite contains at least 50% of lithium cations and/or at least 10% of calcium cations and/or at least 5% of zinc cations.

6. Adsorbent according to claim 1, which has an Si/Al ratio of from 1 to 1.25.

7. Adsorbent according to claim 1, which comprises at least one zeolite selected from the group consisting of a faujasite exchanged with lithium ions whose mean exchange factor is between about 70% and about 88%, a faujasite exchanged with lithium ions whose mean exchange factor is between about 88% and about 93%, and a faujasite exchanged with lithium ions whose mean exchange factor is between about 93% and about 99%.

8. Adsorbent according to claim 1, which comprises at least one zeolite which is a faujasite exchanged with calcium ions whose mean exchange factor is between about 65% and about 95%.

9. PSA process for separation of a gas flow containing at least a first compound, being adsorbed preferentially on at least one adsorbent, and at least a second compound, being less preferentially adsorbed on at least said adsorbent than said first compound, comprising passing gas flow through a heterogeneous adsorbent according to claim 1, and desorbing said first compound from said adsorbent.

10. PSA process according to claim 9, wherein the gas flow to be separated comprises a polar compound, and at least one less polar compound.

11. Device that comprises at least one adsorber containing at least one heterogeneous adsorbent according to claim 1.

12. Process for manufacturing a heterogeneous adsorbent, in which:

a solution of at least one salt of a monovalent, divalent or trivalent metal is percolated through at least one ion-exchange column containing zeolite particles, the percolation is stopped before having consumed a quantity of metal salt equal to about 4 stoichiometric amounts, the monovalent, divalent or trivalent metal content of zeolite particles is homogenized without varying the total quantity of said metal contained in said particles, and so as to obtain a standard deviation for an exchange-factor distribution of between about 0.3% and 5%.

13. Manufacturing process according to claim 12, wherein the metal content is homogenized by closed-loop recirculation of at least some of the metal salt solution.

14. Manufacturing process according to claim 12, wherein the salt is a chloride, the metal is selected from the group consisting of lithium, calcium, sodium, zinc and mixtures thereof, and/or the zeolite is a faujasite whose Si/Al ratio is about 1.

* * * * *